United States Patent [19]

Burt et al.

[11] Patent Number: 4,531,951
[45] Date of Patent: Jul. 30, 1985

[54] METHOD AND APPARATUS FOR RECOVERING BLOWING AGENT IN FOAM PRODUCTION

[75] Inventors: James G. Burt, Oxford, Pa.; Boyd M. Franklin, Blowing Rock, N.C.

[73] Assignee: Cellu Products Company, Hickory, N.C.

[21] Appl. No.: 562,709

[22] Filed: Dec. 19, 1983

[51] Int. Cl.³ .............................................. B01D 53/14
[52] U.S. Cl. ......................................... 55/23; 55/74; 55/179; 264/37
[58] Field of Search .............. 55/23, 59, 80, 74, 179, 55/180, 208; 264/37, 53, DIG. 69

[56] References Cited

U.S. PATENT DOCUMENTS

| 2,838,801 | 6/1958 | De Long et al. | 264/37 |
| 3,607,999 | 9/1971 | Corbett et al. | 264/37 |
| 3,618,301 | 11/1971 | Handman | 55/89 |
| 3,780,744 | 12/1973 | Neel et al. | 131/298 |
| 3,788,331 | 1/1974 | Neel et al. | 131/143 |
| 3,859,404 | 1/1975 | Immel et al. | 264/37 |
| 3,883,624 | 5/1975 | McKenzie et al. | 264/37 |
| 4,065,532 | 12/1977 | Wild et al. | 264/37 |
| 4,394,333 | 7/1983 | Fukushima et al. | 264/37 |

FOREIGN PATENT DOCUMENTS 2713028  9/1978  Fed. Rep. of Germany .......... 55/23

*Primary Examiner*—Charles Hart
*Attorney, Agent, or Firm*—Bell, Seltzer, Park & Gibson

[57] ABSTRACT

The present invention provides a method and apparatus which permits recovering and reusing the volatile blowing agents which are used in the production of thermoplastic foams.

22 Claims, 2 Drawing Figures

METHOD AND APPARATUS FOR RECOVERING BLOWING AGENT IN FOAM PRODUCTION

FIELD OF THE INVENTION

This invention relates to a process and apparatus for the recovery and reuse of volatile blowing agents used in the production of thermoplastic foam materials.

BACKGROUND OF THE INVENTION

In the manufacture of thermoplastic foams, the thermoplastic resin is rendered molten or fluid by the application of heat and/or mechanical working, and the molten plastic resin is then admixed under pressure with a volatile blowing agent, such as a fluorocarbon, to form a solution. This solution, of appropriate viscosity, is passed through a constricted orifice or die into a region of lower pressure, usually atmospheric pressure, causing the dissolved blowing agent to volatilize and form a mass of fine gas bubbles within the body of the fluid resin. Through a variety of processes, the chief of which is the loss of heat, the intimate gas/liquid mixture becomes a gas/solid foam. Subsequent processes such as thermoforming, molding, and trimming may be used to convert the foam into desirable, useful shapes and sizes.

The recovery and reuse of the volatile blowing agent used in foam production would be of obvious economic benefit to the manufacturer, since the blowing agent is a major cost factor in the production of the foam. For example, the production of polyethylene foam may typically use 30 to 40 lbs. of blowing agent for each 100 lbs. of polyethylene resin used. However, until the present invention, no process or apparatus has been developed which will permit recovery and reuse of the blowing agents used in foam production. Thus, the conventional practice in commercial foam production processes has simply been to permit the blowing agents to escape into the atmosphere.

In recent years, there has been a great deal of concern over the harmful or potentially harmful effects of some volatile organic substances in the earth's atmosphere. In particular, there have been a number of studies directed to the effects of fluorocarbon emissions into the atmosphere, and efforts have been made to restrict fluorocarbon emissions in various industrial processes and in consumer items such as aerosol sprays. The present invention now makes it technically possible and economically feasible to collect and recover fluorocarbon blowing agents used in foam production so as to eliminate or significantly reduce the discharge of such agents to the atmosphere.

In order to recover the blowing agent in a form suitable for reuse, the agent must be converted into the form that it will be used in the foam production process, i.e. a liquid, and the blowing agent must be free from contaminants, most notably air. To accomplish this separation from air, the main contaminant, is a primary objective of the present invention.

Processes for recovering volatile compounds such as those used as blowing agents in foam production have been previously used in a number of industrial processes other than foam production. Generally, however, recovery of these materials has only been feasible in processes where it is possible to collect and recove the volatile material at a relatively high concentration without the presence of a large amount of other contaminants, such as air. Examples of several known recovery systems are disclosed in the below-listed U.S. patents:

| U.S. Pat. No. | Inventor | Issue Date |
| --- | --- | --- |
| 3,780,744 | Neel et al | December 25, 1973 |
| 3,788,331 | Neel et al | January 29, 1974 |
| 3,793,801 | Tsao | February 26, 1974 |
| 4,095,605 | Conrad | June 20, 1978 |
| 4,175,932 | Durr et al | November 27, 1979 |
| 4,289,505 | Hardison et al | September 15, 1981 |

The present invention is based upon the recognition that substantial differences exist in the location where the blowing agent is lost from the foam and the amount of blowing agent which is lost, depending upon the particular process and especially upon the exact nature of the resins employed, as well as upon the blowing agent. Resins with substantial aliphatic content, as for example the polyolefins, lose a very substantial portion of the blowing agent in the vicinity of the extrusion die and offer an excellent opportunity for collection and recovery at that location. Polymers with substantial aromatic content such as the styrenic polymers, or heteroatoms, such as the vinyl acetate and vinyl chloride polymers tend to retain the blowing agent for a longer time, and offer additional opportunities for recovery during subsequent processing such as in regrinding of scrap or crushing of the foam. Still, however, a very substantial proportion of the blowing agent is lost in the vicinity of the extrusion die.

SUMMARY OF THE INVENTION

In accordance with the present invention, in order to collect the evolved blowing agents with a minimum of other contaminants, an enclosure is provided at the discharge end of the extruder surrounding the freshly extruded thermoplastic foam material and defining a confined area for collection and accumulation of the blowing agent vapors. Collection of the blowing agent in this confined area provides a significantly higher blowing agent concentration than could be obtained if no enclosure were provided. A stream of air containing the collected blowing agent is withdrawn from the enclosure and directed through a recovery system designed for removing contaminants, such as air, and converting the blowing agent back into a liquid substantially free from contaminants and in a form suitable for reuse in the foam production process.

Broadly stated, the process of the present invention comprises the steps of: extruding a solution of a thermoplastic material and a volatile blowing agent into a confined area while volatilizing the blowing agent to thereby expand and foam the thermoplastic material; withdrawing from the confined area a stream of air containing the volatile blowing agent at a relatively low concentration; concentrating the stream of withdrawn blowing agent laden air to increase the blowing agent concentration, liquefying the blowing agent present in the concentrated stream of blowing agent laden air to produce a liquid blowing agent phase and a gaseous phase containing blowing agent vapor and air; and separating the liquid blowing agent phase from the gaseous phase and recovering the liquid blowing agent for reuse in the production of the foam thermoplastic material.

Because provisions must be made to allow for removal of the thermoplastic foam material from the enclosure after a substantial portion of the blowing agent has been recovered therefrom, it is not possible to make the enclosure perfectly airtight. Typically, air will enter into the enclosure at the opening where the thermoplastic foam material leaves the enclosure, as well at other locations. It has been discovered, however, that by carefully controlling the rate at which the air is withdrawn from the enclosure, it is possible to maximize the recovery of blowing agent in the stream being removed from the enclosure.

Concentration of the blowing agent containing stream of air may be accomplished in various ways, most suitably by adsorption onto an adsorbent such as carbon. Preferably, the adsorption process is carried out in a multichamber adsorber apparatus which permits continuous operation, with one chamber operating in an adsorption mode while another chamber is operating in a desorption mode.

After the concentration step, the more concentrated blowing agent-containing stream is subjected to compressing and condensing to convert the blowing agent into a liquid state suitable for reuse and to separate it from other contaminants, such as water and air.

BRIEF DESCRIPTION OF THE DRAWINGS

Some of the features and advantages of the invention having been stated, others will become apparent as the description proceeds, when taken in connection with the accompanying drawings, in which.

DESCRIPTION OF ILLUSTRATED EMBODIMENT

The present invention is applicable to the production of various types of thermoplastic foam material. Examples of suitable resins which can be foamed include the homopolymers, copolymers and terpolymers of styrene with acrylonitrile or butadine either as copolymers or as grafted segments, both branched and linear polyethylenes, isotactic polypropylene, polybutenes, and copolymers of ethylene with other olefins, copolymers of ethylene and vinylacetate, the homopolymers of vinyl chloride, and copolymers with propylene and vinylidene chloride, and the homopolymers and copolymers of the alkylstyrenes.

Blowing agents suitable for the practice of this invention must have a molecular weight substantially higher than that of the atmosphere, normally air, in which the foaming and subsequent processing is conducted. In addition, the blowing agent must have sufficient volatility to expand the foam. In general, only those agents with normal boiling point below 40° C., and preferably below 10° C., are useful. Suitable agents are propane, butane, 2-methylpropane, 2-methylbutane, pentane, metylchloride, 1,1-dichloro-1-fluorethane, dichlorodifluoromethane, chloropentafluoroethane, trichlorofluoromethane, 1,2-dichlorotetrafluoromethane, 1-chloro-1,1-difluoroethane, 1,1-dichloro-2,2,2-trifluoroethane, vinylchloride, and vinylidene chloride.

Figure 1:
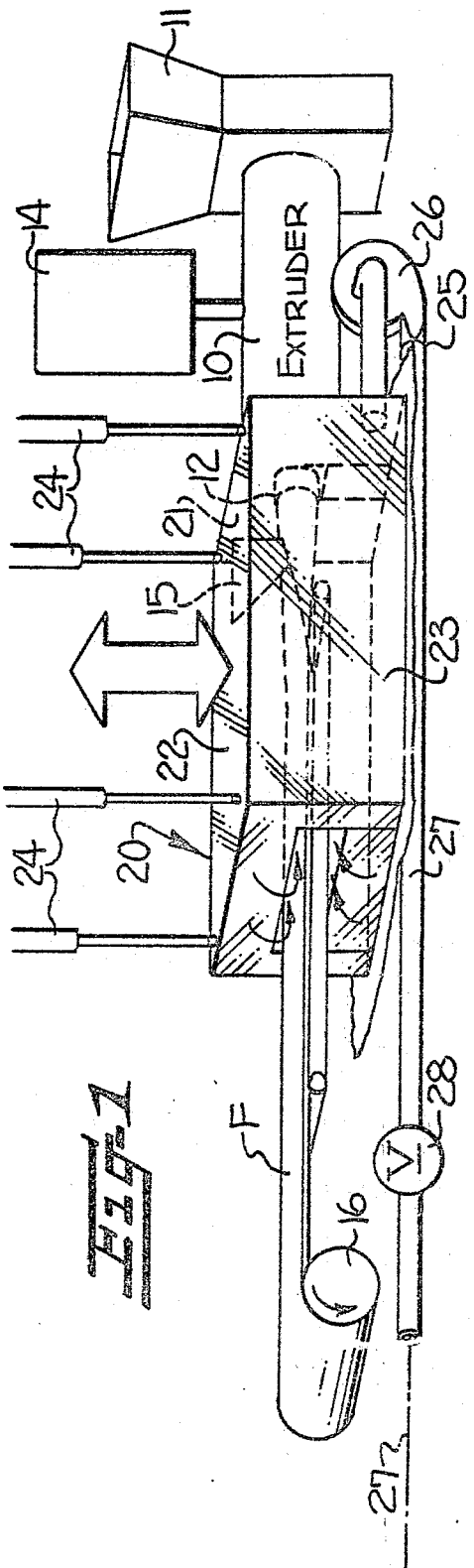
FIG. 1 is a schematic perspective view showing an extruder for use in the production of foam thermoplastic material, and provided with an enclosure for collecting and accumulating the blowing agent which is evolved therefrom in accordance with the present invention.

In the arrangement of apparatus shown in FIG. 1, an extruder 10 has a hopper 11 provided at one end adapted for receiving granular thermoplastic material, while at the opposite end is provided a circular discharge orifice or die 12 from which the molten thermoplastic material is extruded. As the pellets of thermoplastic material are advanced through the extruder and heated and worked into a molten fluent state, blowing agent from a suitable source indicated at 14 is introduced into the extruder and mixed with the fluid thermoplastic material.

In the embodiment illustrated, the foam thermoplastic material, indicated by the reference character F, is extruded from the orifice 12 in the form of a circular hollow tube. The tube is slit by suitable means such as a knife 15 located a short distance downstream from the die 12 to open the tube and convert it into a flat sheetlike form. The sheet of foam material F is advanced longitudinally in the machine direction and is collected in the form of a roll 16 suitable for shipment and/or storage.

An enclosure, generally indicated by the reference character 20, is mounted at the discharge end of the extruder 10 and surrounds and encloses the freshly extruded thermoplastic foam material emerging from the extruder. As illustrated, the enclosure has a fixedly mounted upstream wall 21 through which the extruder die orifice 12 extends. The top wall 22 and longitudinally extending sidewalls 23 are mounted together as a unit and connected to overhead support means generally indicated at 24. The overhead support means 24 permit the enclosure 20 to be raised vertically out of surrounding relation to the foam material to provide access to the extruder 10 and the foam F for servicing and maintenance as is necessary. However, during operation, the enclosure is lowered into an operative position in surrounding relation to the freshly extruded foam as shown in FIG. 1. At the downstream end of the enclosure, an elongate slot-like opening is provided to allow the foam material F to pass through the enclosure in its course of travel to the takeup mechanism. In the preferred embodiment illustrated, the enclosure 20 is formed of a transparent material such as plexiglass to permit observation of the operation of the foam extrusion line.

Figure 2:
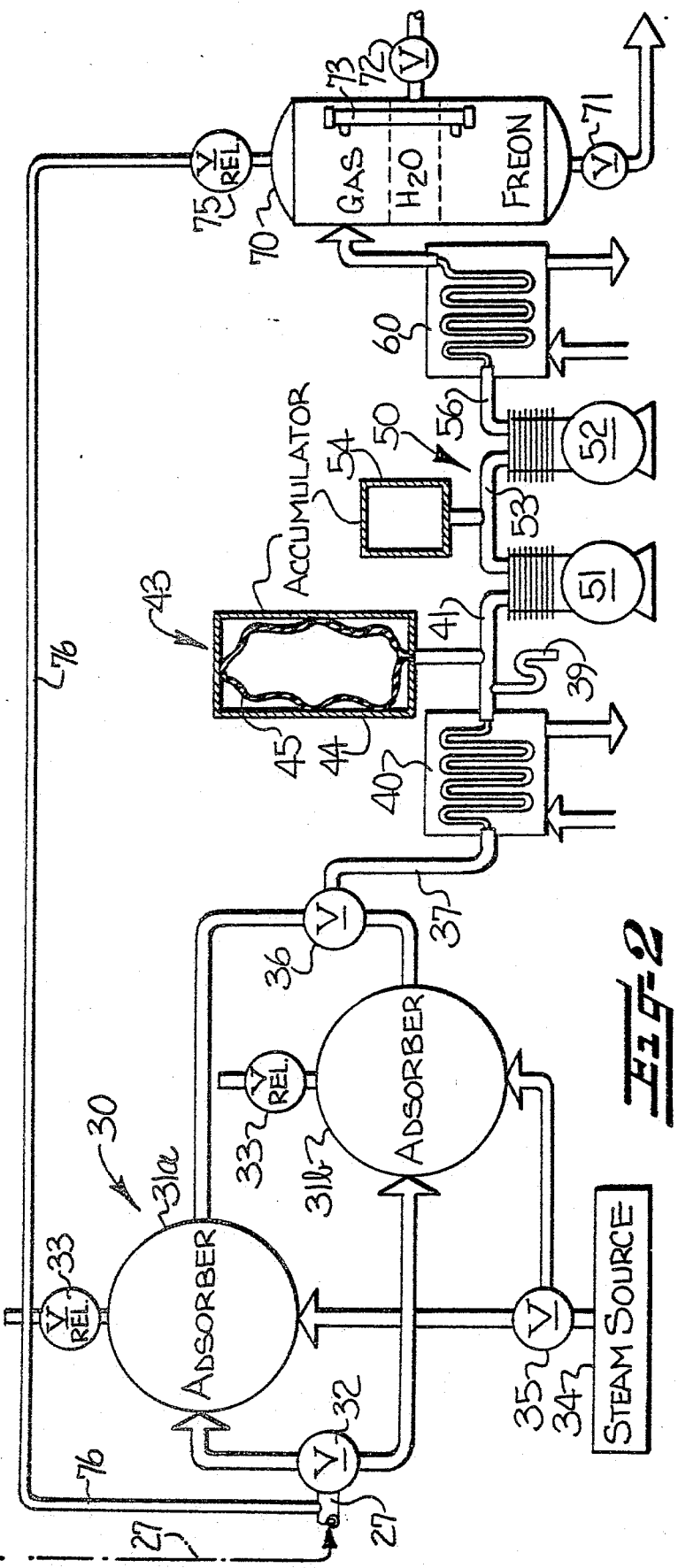
FIG. 2 is a schematic flow diagram illustrating the apparatus employed for concentrating and recovering the blowing agent as a liquid in substantially pure form suitable for reuse.

The blowing agent vapors which are collected within the enclosure 20 are withdrawn through a conduit 25 and directed to a recovery apparatus as illustrated schematically in FIG. 2. More particularly, the conduit 25 is communicatively connected to the suction side of a fan or blower 26, which, in turn, directs the stream of blowing agent and air along a conduit 27 to the recovery apparatus. A valve or damper 28 may be provided at a suitable location, such as in conduit 27, to permit controlling the rate of withdrawal of air from the enclosure 20. By carefully controlling the rate of withdrawal of air from the enclosure, it is possible to optimize or maximize the recovery of blowing agent from the system. If the flow rate is too high, excessive amounts of air will be drawn into the enclosure through available cracks and openings, thereby reducing the concentration of blowing agent vapors which are collected, and also resulting in reducing the overall operating efficiency of the recovery system. Conversely, if the rate of removal from the enclosure is too low, a reduced rate of recovery of the blowing agent will result. The particular flow rate setting for optimum results will vary depending upon the characteristics of the particular extrusion line, as well as upon operating conditions, type of polymer and blowing agent employed and other factors.

Concentration of the collected stream can be effected by carbon adsorption, absorption in an essentially non volatile liquid, cryogenic condensation, gravimetric separation, or a combination of any of these. Condensation of the process emissions, especially of the highly volatile blowing agents, is rarely workable because of the difficulty in excluding moisture which can foul the condensing surfaces with ice or gas hydrates. Compression of the raw process emissions, followed by condensation under high pressure is effective only where the concentration of the blowing agent is relatively high.

The preferred method for initial concentration in accordance with the present invention is by adsorption. Carbon adsorption is much preferred over oil absorption because of the lower investment requirements.

Referring now to FIG. 2, the stream of blowing agent-laden air from conduit 27 is directed into an adsorber means, generally indicated by the reference character 30, which functions to concentrate the blowing agent stream by separating the stream into a blowing agent-rich stream and a blowing agent-lean stream. The blowing agent-rich stream is directed on through the process for ultimate recovery of the blowing agent, while the blowing agent-lean stream is vented to the atmosphere. The adsorber means, more particularly, includes first and second adsorber chambers 31a,31b, respectively, each containing a suitable adsorbent for the particular blowing agents being recovered. Carbon or activated charcoal has been found to be a very suitable adsorbent for recovering most of the types of volatile blowing agents employed in foam production, including those described earlier.

The two adsorber chambers 31a, 31b are connected together through suitable conduit means in such a manner that one of the adsorber chambers functions in an adsorption mode while the other chamber is operating in a desorption mode. By this arrangement, it is possible to operate the system in a substantially continuous manner, periodically reversing the modes of operation of the adsorber chambers when the adsorbent reaches its capacity. As illustrated, a valve 32 directs the incoming blowing agent vapor and air mixture from conduit 27 into either one of the two adsorber chambers 31a,31b, while a valve 33 on the respective chambers 31a,31b allows for venting of the stream to the atmosphere. When the chamber is in the adsorbing mode, valve 32 directs the stream of air and blowing agent vapor into the chamber and into contact with the adsorbent contained therein, and the valve 33 for that particular chamber is opened so that the stream is vented to atmosphere.

The carbon is stripped of its adsorbed agent after an appropriate time of operation. The stripping is accomplished by heating the carbon bed to about 100° C. The use of steam for this purpose is particularly useful since the steam displaces the revaporized blowing agent from the carbon bed and since the steam is readily condensible. The condensation of the steam leaves the blowing agent plus a small but significant volume of air, which was trapped in the adsorbing chamber when the adsorption phase was changed to desorption. The gases remaining after condensation of the steam are compressed mechanically in one or more stages to pressures where most of the blowing agent can be condensed at temperatures that are above the melting point of ice or of gas hydrates.

After the stripping operation is completed, it is highly desirable to dry the carbon bed before returning to the adsorption mode. This may be suitably accomplished by blowing dry, preferably warm, air across the bed for a period of time following the steaming cycle.

As illustrated, a steam source 34 is connected to each chamber through suitable conduits, and a valve 35 directs the steam into the particular chamber which is in the desorbing mode. A valve 36 operates in conjunction with valve 35 to direct the desorbed blowing agent vapors from the chamber which is operating in the desorption mode. As steam is directed through the chamber, the adsorbed blowing agent vapors are released, and these passed from the chamber, through valve 36, and along a conduit indicated at 37. This stream contains blowing agent vapors at a significantly higher concentration than that which was present in the stream originally withdrawn from the enclosure 20. In addition to blowing agent vapors, the stream contains water vapor and some air.

After leaving the adsorber means 30, the blowing agent containing stream from conduit 37 is directed into and through a condenser 40. The condenser 40 cools the stream and causes a major portion of the water vapor contained therein to condense, and the water is removed from the system through a trap 39. After leaving the condenser 40, the gaseous stream is directed along a conduit 41 to a multi-stage compressor means generally indicated at 50, and including a first stage compressor 51 and a second stage compressor 52.

Connected to the conduit 41 leading from the condenser 40 to the first stage compressor 51 is a variable volume accumulator means, generally indicated by the reference character 43. The accumulator means 43 includes a conduit 44 connected to a flexible inflatable bladder 45. The purpose of this accumulator means 43 is to function as a surge tank. In this regard, the desorption operation evolves blowing agent vapors at a varying rate. During the early portion of the desorption cycle, the blowing agent vapors are evolved relatively rapidly. However, the rate of blowing agent evolution tends to gradually drop off as the desorption cycle continues. The accumulator means 43 collects and accumulates the evolved blowing agent vapors so as to permit the first compressor stage 51 to operate substantially continuously at a constant rate.

In the first compressor stage, the gas is compressed from atmospheric pressure to a pressure 30 psi below the saturation pressure of the blowing agent. The compressed gas is then directed from the first compressor stage 51 along a conduit 53 to the second compressor stage 52. Desirably, an accumulator means 54 is also communicatively connected between the first and second compressor stages. This accumulator means 54 may simply take the form of a pressure tank. In the second compressor stage, the gas is compressed to a pressure which exceeds the saturation pressure of the blowing agent. The pressure on the discharge side of the second stage compressor 52 may, for example, be in the range of about 100 to 200 psig. The compressed gases at this point contain considerable heat energy due to the compression. Upon leaving the second compressor 52, the gases are directed along a conduit 56 to a condenser 60, where heat energy is removed sufficient to condense the blowing agent into a liquid form. The compressor 60 may be cooled by suitable means such as water or other refrigerants. The condensed blowing agent, together with uncondensed gases, are directed from the condenser 60 to a pressurized receiving vessel 70. In the receiving vessel 70, the condensed liquid blowing agent will accumulate in the lower portion of the vessel. Water will also form as a separate immiscible phase above the blowing agent phase. The gases which accumulate in the upper portion of the vessel predominantly contain blowing agent vapor, together with air and water vapor.

The recovered blowing agent may be withdrawn from the vessel under pressure via a valve 71. A valve 72 located in a medial portion of the vessel is provided to permit drawing off water periodically as necessary. To facilitate observing the level of blowing agent and water in the vessel, suitable means such as sight glass 73 may be provided.

The uncondensed gas present in the upper portion of the vessel 70 may contain from one to 50% by volume of air, but since the preferred blowing agents are higher in molecular weight, the uncondensed gases may be more than 50% by weight of the blowing agent. The receiver 70 for the condensed, recovered blowing agent is designed to have a vertical quiescent zone in the upper portion where the uncondensed gas accumulates. A pressure relief valve 75 is provided to release the pressure periodically as air accumulates in the quiescent zone above the recovered liquid. Preferably, the pressure relief valve is set at least 50% higher than the saturation or vapor pressure of the liquefied blowing agent. Since higher molecular weight gases tend to separate by gravity from air, the vent located at the top of the receiver chamber 70 releases gases relatively richer in air and poorer in blowing agent. The vented gases, which still contain significant amounts of blowing agent, are returned to the adsorber system 30 via a conduit 76 to permit recovery of the blowing agent.

In the drawings and specification, there has been set forth a preferred embodiment of the invention, and although specific terms are employed, they are used in a generic and descriptive sense only and not for purposes of limitation.

That which is claimed is:

1. A process for recovering the volatile blowing agents employed in the production of expanded foam thermoplastic materials to permit their reuse in the production of the foam thermoplastic materials and to also reduce emissions of the blowing agents to the atmosphere, said process comprising extruding a solution of the thermoplastic material and volatile blowing agent into a confined area while volatilizing the blowing agent to thereby expand and foam the thermoplastic material, withdrawing from the confined area a stream of air containing the volatile blowing agent at a relatively low concentration, concentrating the stream of withdrawn blowing agent-laden air by selective adsorption-desorption of the volatile blowing agent on an absorbent to increase the blowing agent concentration, liquefying the blowing agent present in said concentrated stream of blowing agent-laden air to produce a liquid blowing agent vapor and air, and separating the liquid blowing agent phase from the gaseous phase and recovering the liquid blowing agent for reuse in the production of the foam thermoplastic material.

2. A process as claimed in claim 1 wherein said step of extruding the solution of thermoplastic material and blowing agent into a confined area comprises discharging the solution from the discharge orifice of an extruder into an enclosure surrounding the freshly extruded thermoplastic material.

3. A process as claimed in claim 1 including the step of controlling the rate of withdrawal of the stream of air and blowing agent so as to maximize the blowing agent concentration.

4. A process as claimed in claim 1 wherein said step of liquefying the blowing agent comprises compressing and condensing the blowing agent to convert it into a liquid phase.

5. A process as claimed in claim 1 wherein said step of separating the liquid phase from the gaseous phase additionally includes recycling the gaseous phase to said concentrating step to permit recovery of the blowing agent vapors contained therein.

6. A process as claimed in claim 1 wherein the volatile blowing agent has a molecular weight greater than that of air and a boiling point of less than 40 degrees C.

7. A process as claimed in claim 1 wherein the volatile blowing agent is selected from the group consisting of propane, butane, 2-methylpropane, 2-methylbutane, pentane, methylchloride, 1,1-dichloro-1fluorethane, dichlorodifluoromethane, chloropentafluoroethane, trichlorofluoromethane, 1,2-dichlorotetrafluoromethane, 1-chloro-1,1-difluoroethane, 1,1-dichloro-2,2,2-trifluoroethane, vinyl chloride, vinylidene chloride, and mixtures of these.

8. A process for recovering the volatile blowing agents employed in the production of expanded foam thermoplastic materials to permit their reuse in the production of the foam thermoplastic materials and to also reduce emissions of the blowing agents to the atmosphere, said process comprising discharging a pressurized solution of the thermoplastic material and volatile blowing agent from an extruder into the ambient atmosphere while volatilizing the blowing agent to thereby expand and foam the thermoplastic material, confining the air in a predetermined area surrounding the freshly extruded thermoplastic material while withdrawing from the confined area a stream of air containing the volatile blowing agent at a relatively low concentration, directing the stream of withdrawn air to an adsorber and adsorbing the volatile blowing agent on an adsorbent, desorbing the blowing agent from the adsorbent to thereby produce a stream of gas containing a relatively higher concentration of volatile blowing agent, compressing and condensing the concentrated stream of blowing agent-laden gas to form a liquid blowing agent phase and a gaseous phase containing air and blowing agent vapors, separating the liquid blowing agent phase from the gaseous phase and recovering the liquid blowing agent under pressure for reuse in the production of the foamed thermoplastic material, and recycling the gaseous phase to said adsorbing step for recovery of the blowing agent vapors contained therein.

9. A process as claimed in claim 8 wherein said adsorbing step and said desorbing step are carried out concurrently in separate chambers.

10. A process as claimed in claim 9 wherein said desorbing step comprises directing heated air and water vapor into and through the bed of adsorbent to desorb the blowing agent therefrom, and wherein said compressing and condensing step produces a liquid phase containing immiscible liquid phases of water and blowing agent, and wherein said separating step additionally includes separating the water phase from the liquid blowing agent phase.

11. A process as claimed in claim 8 wherein said step of desorbing the volatile blowing agent from the adsorbent includes collecting and accumulating the desorbed gaseous phase in a variable volume accumulator.

12. A process as claimed in claim 11 wherein said adsorbent comprises carbon.

13. A process for recovering the volatile blowing agents employed in the production of expanded foam thermoplastic materials to permit their reuse in the production of the foam thermoplastic materials and to also reduce emissions of the blowing agents to the atmosphere, said process comprising
  discharging a pressurized solution of the thermoplastic material and volatile blowing agent from an extruder into the ambient atmosphere while volatilizing the blowing agent to thereby expand and foam the thermoplastic material,
  moving an enclosure into surrounding relation to the freshly extruded thermoplastic material to form a confined area for receiving the volatile blowing agent vapors,
  withdrawing from the enclosure a stream of air containing the volatile blowing agent vapors,
  separating the withdrawn stream of air into a blowing agent-rich stream and a blowing agent-lean stream,
  compressing and condensing the concentrated stream of blowing agent-laden gas to form a liquid blowing agent phase and a gaseous phase containing air and blowing agent vapors,
  separating the liquid blowing agent phase from the gaseous phase and recovering the liquid blowing agent under pressure for reuse in the production of the foamed thermoplastic material, and
  recycling the gaseous phase to said adsorbing step for recovery of the blowing agent vapors contained therein.

14. A process as claimed in claim 13 additionally including moving the enclosure out of surrounding relation to the freshly extruded thermoplastic material at times when servicing of the extruder is required.

15. An apparatus for recovering the volatile blowing agents employed in the production of expanded foam thermoplastic materials to permit their reuse in the production of the foam thermoplastic materials and to also reduce emissions of the blowing agents to the atmosphere, said apparatus comprising
  an extruder including means for discharging a solution of the thermoplastic material and volatile blowing agent so as to produce an expanded foam thermoplastic material,
  enclosure means located adjacent to the discharge of the extruder and defining a confined area surrounding the freshly extruded thermoplastic material,
  means for withdrawing from said enclosure means a stream of air containing the volatile blowing agent at a relatively low concentration,
  means for receiving the said stream of air and blowing agent and concentrating the stream to increase the blowing agent concentration by selective adsorption-desorption on an adsorbent,
  means for receiving the concentrated stream of blowing agent-laden air and for compressing and condensing the stream to form a liquid blowing agent phase and a gaseous phase containing air and blowing agent vapor, and
  means for separating the liquid blowing agent phase from the gaseous phase to recover the liquid blowing agent for reuse in the production of the foam thermoplastic material.

16. An apparatus as claimed in claim 15 wherein said means for concentrating the stream of air and blowing agent comprises an adsorber including two chambers and means communicatively interconnecting the two chambers and cooperating therewith so that one of the chambers is operable in an adsorption mode while the other chamber is operable in a desorption mode to thereby provide for continuous operation.

17. An apparatus as claimed in claim 15 wherein said means for compressing and condensing the concentrated stream of blowing agent-laden air includes first and second successively interconnected compresser stages, and including a variable volume accumulator means operatively connected between said adsorber and said first compressor stage for receiving blowing agent-laden air being desorbed from the adsorber at a varying rate of flow and for providing the blowing agent laden air to said first compressor stage at a substantially constant rate of flow.

18. An apparatus as claimed in claim 17 additionally including a variable volume accumulator means operatively connected between said first and second compressor stages.

19. An apparatus as claimed in claim 15 wherein said means for separating the liquid phase from the gaseous phase comprises a receiver tank for receiving the two phases under pressure, and means connected to said tank in communication with the liquid phase and operable for removing the pressurized liquid from the tank.

20. An apparatus as claimed in claim 19 including a pressure relief valve connected to said receiver tank in communication with the gaseous phase and operable for venting the gaseous phase when the pressure in the tank reaches a predetermined level, and conduit means communicatively connected to the relief valve for directing the vented gaseous phase to said means for concentrating the stream to permit recovery of the blowing agent vapors contained therein.

21. An apparatus as claimed in claim 15 wherein said enclosure means includes means mounting the enclosure for movement between an operative position surrounding the freshly extruded thermoplastic material and an inoperative position out of surrounding relationship with the freshly extruded thermoplastic material for providing access thereto for servicing.

22. An apparatus for recovering the volatile blowing agents employed in the production of expanded foam thermoplastic materials to permit their reuse in the production of the foam thermoplastic materials and to also reduce emissions of the blowing agents to the atmosphere, said apparatus comprising
  an extruder including means for discharging a solution of the thermoplastic material and volatile blowing agent so as to produce an expanded foam thermoplastic material,
  enclosure means located adjacent to the discharge of the extruder and defining a confined area surrounding the freshly extruded thermoplastic material,
  means for withdrawing from said enclosure means a stream of air containing the volatile blowing agent at a relatively low concentration, adsorber means operatively connected to said enclosure means for receiving said stream of air and blowing agent and for concentrating the stream to produce a blowing agent-rich stream and a blowing agent-lean stream, said adsorber means including first and second adsorption chambers each containing therein an adsorbent for said blowing agent, and conduit means communicatively interconnecting the two chambers and cooperating therewith so that one of the chambers is operable in an adsorption mode while the other chamber is operable in a desorption mode to thereby provide for continuous operation, said conduit means being so constructed that the chamber which is in the adsorption mode has an inlet communicatively connected to said enclosure means for receiving the stream of air and blowing agent therefrom and an outlet communicating with the atmosphere for discharging said blowing agent-lean stream, and the chamber which is in the desorption mode having an inlet connected to a source of steam for being directed into contact with the adsorbent for desorbing the blowing agent and having an outlet for discharge of a blowing agent-rich stream containing blowing agent vapor, water vapor, and air, variable volume accumulator means communicatively connected for receiving and accumulating said blowing agent-rich stream, compresser means communicatively connected to said accumulator means and operable for receiving said blowing agent-rich stream therefrom and for compressing the blowing agent-rich stream to a pressure greater than critical pressure of the blowing agent, condenser means connected to said compressor means for receiving the compressed blowing agent-rich stream and for cooling and condensing the same to form a liquid blowing agent phase, a water phase, and a gaseous phase containing blowing agent vapor, water vapor and air, a receiver vessel operatively connected to said condenser means for receiving and separating as separate immiscible phases the liquid blowing agent, the water, and the gaseous phase, means for withdrawing the liquid blowing agent from said receiver vessel to permit reuse thereof in the production of the foam thermoplastic material, and means for venting the gaseous phase from the receiver vessel and for directing the gaseous phase to said adsorber means to permit recovery of the blowing agent vapors contained therein.

* * * * *